3,458,518
10,5-(IMINOMETHANO)-10,11-DIHYDRO-5H-
DIBENZO[a,d]CYCLOHEPTEN-11-ONES
Thomas A. Dobson, St. Laurent, Montreal, Quebec, and
Martin A. Davis, Montreal, Quebec, Canada, assignors
to American Home Products Corporation, New York,
N.Y., a corporation of Delaware
No Drawing. Filed Nov. 1, 1966, Ser. No. 591,090
Int. Cl. C07d 33/10; A61k 27/00
U.S. Cl. 260—286　　　　　　　　　　　　　4 Claims

ABSTRACT OF THE DISCLOSURE 10,5-(iminomethano) 10,11-dihydro 5H dibenzo[a,d]
cycloheptene - 11 - ones having CNS and anti-bacterial
properties are disclosed.

This invention relates to novel chemical compounds
having useful biological properties. In particular, this
invention relates to novel 10,5-(iminomethano)-10,11-
dihydro-5H-dibenzo[a,d]cycloheptene - 11 - ones of the
following generic Formula I:

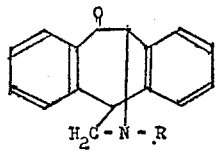

wherein R represents hydrogen, or an organic group,
such as, for example, a lower alkyl group containing
from 1–6 carbon atoms, or an aralkyl group containing
from 7–10 carbon atoms, such as, for example, the benzyl, phenethyl, or trimethoxybenzyl groups.

This invention also relates to the salts of the compounds
of Formula I with pharmaceutically acceptable acids.

The compounds of Formula I are prepared from the
corresponding 10,5-(iminomethano)-10,11-dihydro - 5H-
dibenzo[a,d]-cycloheptene - 11,13 - dione of Formula II,
wherein R is as defined above, by reducing the 13-carbanyl
function with a complex alkali metal aluminium hydride
after protecting the 11-carbonyl function by converting it
to a ketal function. Finally, the ketal function is removed
to give the corresponding compound of Formula I wherein R is as defined above.

More specifically, a mixture of a 10,5-(iminomethano)-
10,11 - dihydro - 5H - dibenzo[a,d]cyclohepten - 11,13-
dione of Formula II wherein R is as defined above, a
water immiscible inert solvent such as, for example, benzene or toluene, a molar excess of a lower alkanol or a
lower alkylene glycol such as, for example, ethylene glycol or propylene glycol, and an acidic catalyst such as,
for example, sulphuric acid or p-toluenesulphonic acid,
is boiled in an apparatus suitable for the continuous removal of water until no more water appears in the distillate. The mixture is cooled and then washed with an
aqueous solution of an alkali metal hydroxide, preferably
1 N sodium hydroxide. The organic phase is evaporated
and the residual 11-ketal of Formula III is used without
further purification. In its turn, this compound is dissolved
in an inert solvent such as, for example, ether or tetrahydrofuran or dioxan and treated with a complex alkali
metal aluminium hydride such as, for example, lithium
aluminium hydride. The mixture is heated at a temperature within the range of from 30–100° C. for a period of
time of up to one day to give, after hydrolysis of the
resulting complex the crude 11-ketal of Formula IV.
This compound, in its turn, is treated with an aqueous
solution of a mineral acid for a period of time of up to
one day. The mixture is rendered alkaline to give, after
purification in a conventional manner, such as, for example, by chromatography or crystallization, the 10,5-
(iminomethano)- - 10,11 - dihydro-5H-dibeno[a,d,]cyclohepten-11-one of Formula I.

The latter compounds of Formula I may then be reacted
with a pharmaceutically acceptable acid, such as, for
example, hydrochloric, sulphuric, oxalic, maleic, or citric
acid, to yield the corresponding acid addition salts which
are pharmacologically equivalent to their free bases.

The compounds of Formula I possess anti-bacterial
properties against gram-positive and gram-negative organisms. Thus they may be formulated in the form of
lotions or creams containing from 0.1 to 1% of the active
ingredient to be applied topically to the skin once to four
times daily.

The compounds of this invention also possess marked
activity upon the central nervous system, in particular
anti-convulsant activity, especially against electro-shock
to a very high degree, together with a low order of toxicity.
Thus the compounds are useful as anti-convulsant agents.
As such they may be formulated into tablets or capsules
with suitable excipients such as, for example, starch or
lactose, each tablet or capsule containing from 75–500
mg. of the active ingredient. Such capsules may be administered from one to four times per day for prolonged
periods of time.

The starting materials for the compounds of this invention, that is the 10,5 - (iminomethano) - 10,11 - dihydro - 5H - dibenzo[a,d]cycloheptene - 11,13 - diones of
Formula II wherein R is as defined above are prepared
as described in my co-pending U.S. patent application
S.N. 552,387, filed May 24, 1966.

In brief, this process entails the addition of one molar
proportion of bromine to 5H-dibenzo[a,d]cycloheptene-
5-carboxamide and treatment of the resulting product
with boiling water or a boiling lower alkanol to give 11-
bromo - 10,5 - (epoxymethano) - 10,11 - dihydro - 5H-
dibenzo[a,d]cycloheptene-13-one. In its turn, this compound is treated with either ammonium hydroxide or an
aqueous solution of suspension of a primary amine of
formula $RNH_2$ wherein R is as defined above in a sealed
vessel at a temperature in the range of 100° to 140° C.
to give the corresponding 11 - hydroxy - 10,5 - (iminomethano) - 10,11 - dihydro - 5H - dibenzo[a,d]cycloheptene-13-one of Formula V wherein R is as defined
above. In its turn thiscompoundisdissolvedorsuspended
in an inert solvent, preferably acetone and treated with
a molar excess of an aqueous solution of chromic acid
to give the corresponding 10,5-(iminomethano)-10,11-
dihydro - 5H - dibenzo[a,d]cycloheptene - 11,13 - dione
of Formula II wherein R is as defined above.

The following formulae and examples are illustrative of this invention:

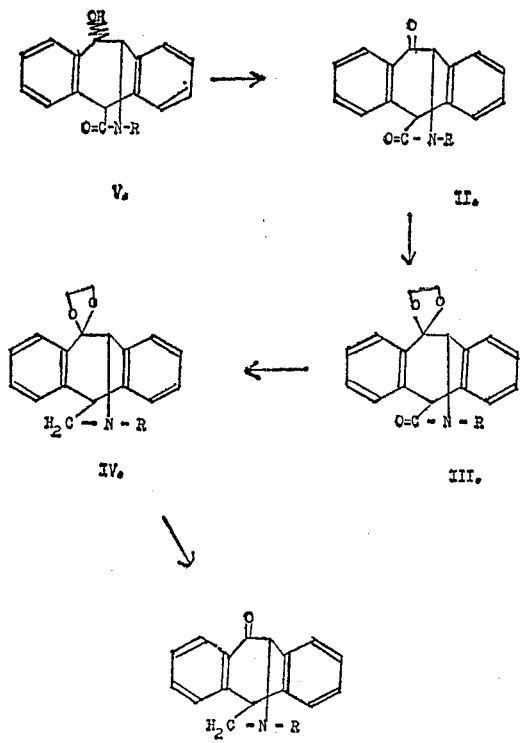

EXAMPLE 1

The ethylene ketal of 10,5-(iminomethano)-10,11-dihydro-5H-dibenzo[a,d]cycloheptene-11,13-dione A mixture of 10.5-(iminomethano)-5H-dibenzo [a,d]-cycloheptene-11,13-dione (10 g.) benzene (200 ml.), ethylene glycol (10 ml.), p-toluenesulphonic acid (0.3 g.) is heated under reflux for 20 hours, with continuous removal of water using a Dean-Stark head. The resulting suspension is cooled and diluted with aqueous sodium hydroxide solution (50 ml. of a 10% solution). The mixture is filtered and the solids are thoroughly washed with water and dried to give the title product with M.P. 265–269° C. A further quantity of the product is obtained upon evaporation of the washed and dried organic phase.

EXAMPLE 2

10,5-(imonomethano)-10,11-dihydro-5H-dibenzo [a,d]cyclohepten-11-one

A suspension of the ketal obtained as described in Example 1 (5.0 g.), and lithium aluminum hydride (2.5 g.), in dry tetrahydrofuran (100 ml.), is stirred and heated under reflux for 5 hours. Water (6.0 ml.), is cautiously added to the cooled mixture and when the hydrolysis is complete the mixture is filtered through a pad of diatomaceous earth. The filtrate is combined with the washings of the inorganic precipitate and evaporated to dryness in vacuo. The oily residue thus obtained consists of the desired 11-ketal derivative of the title product in free base form and is characterized by its infrared spectrum which shows $\mu_{max}$ at 3340, 1495, 1452, 1100, and 1070 cm.$^{-1}$. This compound is treated with hot hydrochloric acid (100 ml. of a 10% solution) for 0.5 hour and the mixture is kept at room temperature overnight. The precipitate is collected and washed with water to give the hydrochloric acid addition salt of the title product with M.P. 284° C. (decomp.). The filtrate is rendered alkaline and extracted with ether. Evaporation of the ethereal extracts leaves the title product as an oil characterized by its infra-red absorption spectrum with $\mu_{max}$ at 3340, 1673, 1600, 1497, and 1452 cm.$^{-1}$.

EXAMPLE 3

In the same manner as described in Examples 1 and 2, but using as starting material 12-methyl-, 12-ethyl-, 12-propyl-, 12-butyl-, 12-pentyl-, 12-hexyl-, 12-benzyl-, 12-phenethyl-, or 12-trimethoxybenzyl-10,5-(iminomethano)-10,11-dihydro-5H-dibenzo[a,d]cycloheptene-11,13-dione instead of 10,5-(iminomethano)-10,11-dihydro-5H-dibenzo[a,d]cycloheptene-11,13-dione the corresponding 12-methyl-, 12-ethyl-, 12-propyl-, 12-butyl-, 12-pentyl-, 12-hexyl, 12-benzyl-, 12-phenethyl-, or 12-trimethoxybenzyl - 10,5 - (iminomethano)-10,11-dihydro-5H-dibenzo [a,d]cyclohepten-11-one is obtained.

The acid addition salts of the above compounds with mineral acids, such as, for example, hydrochloric or sulfuric acids, are obtained as described in Example 2. If it is desired to obtain the acid addition salts with organic acids, such as, for example, oxalic, maleic, or citric acids. The above compounds are reacted in ethereal or methanolic solutions with the appropriate acid, to obtain the oxalate, maleate, or citrate salts.

We claim:
1. A compound selected from the group which consists of compounds of the formula

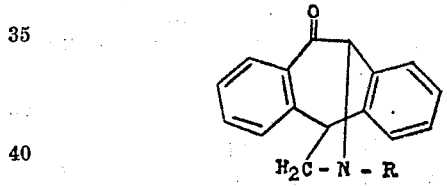

wherein R is selected from the group which consists of hydrogen, lower alkyl, benzyl, phenethyl and trimethoxybenzyl; and addition salts thereof with pharmaceutically acceptable acids.

2. 10,5 - (iminomethano) - 10,11-dihydro-5H-dibenzo [a,d]cyclohepten-11-one, as claimed in claim 1.

3. The hydrochloric acid addition salt of 10,5-(iminomethano) - 10,11-dihydro-5H-dibenzo[a,d]cyclohepten-11-one, as claimed in claim 1.

4. The ethylene ketal of 10,5-(iminomethano)-10,11-dihydro-5H-dibenzo[a,d]cycloheptene-11,13-dione.

References Cited

UNITED STATES PATENTS 3,310,565   3/1960   Galansay _____ 260—288

OTHER REFERENCES

Battersby et al.: Jour. Chem. Soc., 1958, p. 1988.
Davis et al.: Jour. Med. Chem., vol. 7, p. 88 (1964).

ALEX MAZEL, Primary Examiner
D. A. DAUS, Assistant Examiner

U.S. Cl. X.R.
260—239.3, 289; 424—258